(12) United States Patent
Batchu et al.

(10) Patent No.: US 9,510,349 B2
(45) Date of Patent: Nov. 29, 2016

(54) METHODS AND APPARATUS FOR ENHANCING USER EQUIPMENT PERFORMANCE WITH EFFICIENT RESOURCE MANAGEMENT

(71) Applicant: QUALCOMM Incorporated, San Diego, CA (US)

(72) Inventors: Bhaskara Viswanadham Batchu, Ap. (IN); Parthasarathy Krishnamoorthy, Hyderabad (IN); Rashid Ahmed Akbar Attar, San Diego, CA (US); Jun Hu, San Diego, CA (US); Anand Rajurkar, Hyderabad (IN); Dhananjaya Sarma Ponukumati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 14/336,519

(22) Filed: Jul. 21, 2014

(65) Prior Publication Data

US 2016/0021654 A1 Jan. 21, 2016

(51) Int. Cl.
*H04J 3/00* (2006.01)
*H04W 72/04* (2009.01)
*H04W 72/12* (2009.01)
*H04W 88/06* (2009.01)

(52) U.S. Cl.
CPC ..... *H04W 72/0446* (2013.01); *H04W 72/1215* (2013.01); *H04W 72/1242* (2013.01); *H04W 88/06* (2013.01)

(58) Field of Classification Search
None
See application file for complete search history.

(56) References Cited

U.S. PATENT DOCUMENTS 9,008,671 B2 * 4/2015 Fodor ................... H04W 48/18 455/443
2011/0217969 A1 9/2011 Spartz et al.
2011/0305220 A1 * 12/2011 Lindoff ................. H04W 28/26 370/331
2011/0319072 A1 * 12/2011 Ekici ..................... H04W 48/18 455/426.1
2012/0034881 A1 * 2/2012 Warken ................. H04W 88/10 455/68

(Continued)

FOREIGN PATENT DOCUMENTS

WO WO-2012059793 A1 5/2012
WO WO-2012168255 A1 12/2012

OTHER PUBLICATIONS

International Search Report and Written Opinion—PCT/US2015/040197—ISA/EPO—Oct. 29, 2015.

*Primary Examiner* — Phirin Sam
(74) *Attorney, Agent, or Firm* — Knobbe Martens Olson & Bear, LLP

(57) ABSTRACT

Methods and apparatus for wireless communication are provided. In one aspect, a method of wireless communication comprises receiving a first resource request including a first interval for at least one timing-priority task associated with a first radio access technology and a second resource request including a second interval for at least one timing-non-priority task associated with the first radio access technology. The method comprises granting the first resource request and reserving the first interval for the at least one timing-priority task associated with the first radio access technology. The method comprises receiving at least a third resource request including a third interval for at least one timing-priority task associated with a second radio access technology. The method comprises granting the third resource request and reserving the third interval for the at least one timing-priority task associated with the second radio access technology when the first interval and the third interval do not overlap.

30 Claims, 8 Drawing Sheets

(56) References Cited

U.S. PATENT DOCUMENTS

| | | | |
|---|---|---|---|
| 2012/0258713 A1* | 10/2012 | Whinnett | H04W 48/20 455/435.1 |
| 2012/0309440 A1* | 12/2012 | Orjmark | H04W 72/1215 455/509 |
| 2013/0021933 A1* | 1/2013 | Kovvali | H04W 28/0236 370/252 |
| 2013/0053076 A1 | 2/2013 | Chang et al. | |
| 2013/0065644 A1 | 3/2013 | Bishop et al. | |
| 2013/0079009 A1* | 3/2013 | Aumann | H04W 16/02 455/436 |
| 2013/0095821 A1* | 4/2013 | Lim | H04W 72/0406 455/426.1 |
| 2013/0150014 A1 | 6/2013 | Gong et al. | |
| 2013/0203426 A1 | 8/2013 | Harnay | |
| 2013/0210447 A1* | 8/2013 | Moe | H04W 72/0486 455/453 |
| 2013/0272212 A1* | 10/2013 | Tabet | H04W 36/0066 370/329 |
| 2013/0331137 A1* | 12/2013 | Burchill | H04W 52/243 455/501 |
| 2014/0094131 A1 | 4/2014 | Clevorn et al. | |
| 2014/0146699 A1* | 5/2014 | Axmon | H04W 24/10 370/252 |
| 2014/0213277 A1* | 7/2014 | Jang | H04W 28/08 455/453 |
| 2015/0063311 A1* | 3/2015 | Chindapol | H04W 36/0005 370/332 |
| 2015/0139080 A1* | 5/2015 | Ellenbeck | H04L 1/00 370/329 |
| 2015/0237645 A1* | 8/2015 | Andrianov | H04W 72/1215 370/329 |
| 2015/0296520 A1* | 10/2015 | Batchu | H04W 72/0493 455/434 |

* cited by examiner

_METHODS AND APPARATUS FOR ENHANCING USER EQUIPMENT PERFORMANCE WITH EFFICIENT RESOURCE MANAGEMENT_

BACKGROUND

1. Field

Certain aspects of the present disclosure generally relate to wireless communication systems, and more particularly, to methods and apparatus for enhancing user equipment (UE) performance with efficient resource management.

2. Background

In many telecommunication systems, communications networks are used to exchange messages among several interacting spatially-separated devices. In some implementations, a UE may be configured to communicate utilizing more than one communication protocol utilizing more than one radio access technology (RAT). Such devices may be known as multi-SIM devices. When managing the UE's access to more than one RAT, the probability that a reservation request for one RAT may conflict with a reservation request for another RAT increases. Moreover, multi-SIM UEs conventionally request reservations of time in the same block for both timing-priority communication tasks as well as timing-non-priority communication tasks, resulting in large, single reservation requests. Because these single reservation requests are relatively large, the probability of reservation request conflicts between multiple RATs increases substantially. Accordingly, there is a need for an efficient approach to improve mobile terminated call success rates for multi-SIM devices through efficient resource request management.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for wireless communication. The method includes receiving a first resource request including a first interval for at least one timing-priority task associated with a first radio access technology and a second resource request including a second interval for at least one timing-non-priority task associated with the first radio access technology. The method includes granting the first resource request and reserving the first interval for the at least one timing-priority task associated with the first radio access technology. The method includes receiving at least a third resource request including a third interval for at least one timing-priority task associated with a second radio access technology. The method includes granting the third resource request and reserving the third interval for the at least one timing-priority task associated with the second radio access technology when the first interval and the third interval do not overlap.

Another aspect of the disclosure provides an apparatus for wireless communication. The apparatus includes a processor configured to receive a first resource request including a first interval for at least one timing-priority task associated with a first radio access technology and a second resource request including a second interval for at least one timing-non-priority task associated with the first radio access technology. The processor is configured to grant the first resource request and reserve the first interval for the at least one timing-priority task associated with the first radio access technology. The processor is configured to receive at least a third resource request including a third interval for at least one timing-priority task associated with a second radio access technology. The processor is configured to grant the third resource request and reserve the third interval for the at least one timing-priority task associated with the second radio access technology when the first interval and the third interval do not overlap.

Another aspect of the disclosure provides a non-transitory computer-readable medium, comprising code that, when executed, causes a processor to receive a first resource request including a first interval for at least one timing-priority task associated with a first radio access technology and a second resource request including a second interval for at least one timing-non-priority task associated with the first radio access technology. The code, when executed, further causes the processor to grant the first resource request and reserve the first interval for the at least one timing-priority task associated with the first radio access technology. The code, when executed, further causes the processor to receive at least a third resource request including a third interval for at least one timing-priority task associated with a second radio access technology. The code, when executed, further causes the processor to grant the third resource request and reserve the third interval for the at least one timing-priority task associated with the second radio access technology when the first interval and the third interval do not overlap.

Another aspect of the subject matter described in the disclosure provides an apparatus for wireless communication comprising means for receiving a first resource request including a first interval for at least one timing-priority task associated with a first radio access technology and a second resource request including a second interval for at least one timing-non-priority task associated with the first radio access technology. The apparatus comprises means for granting the first resource request and reserving the first interval for the at least one timing-priority task associated with the first radio access technology. The apparatus comprises means for receiving at least a third resource request including a third interval for at least one timing-priority task associated with a second radio access technology. The apparatus comprises means for granting the third resource request and reserving the third interval for the at least one timing-priority task associated with the second radio access technology when the first interval and the third interval do not overlap.

DETAILED DESCRIPTION

Figure 1:
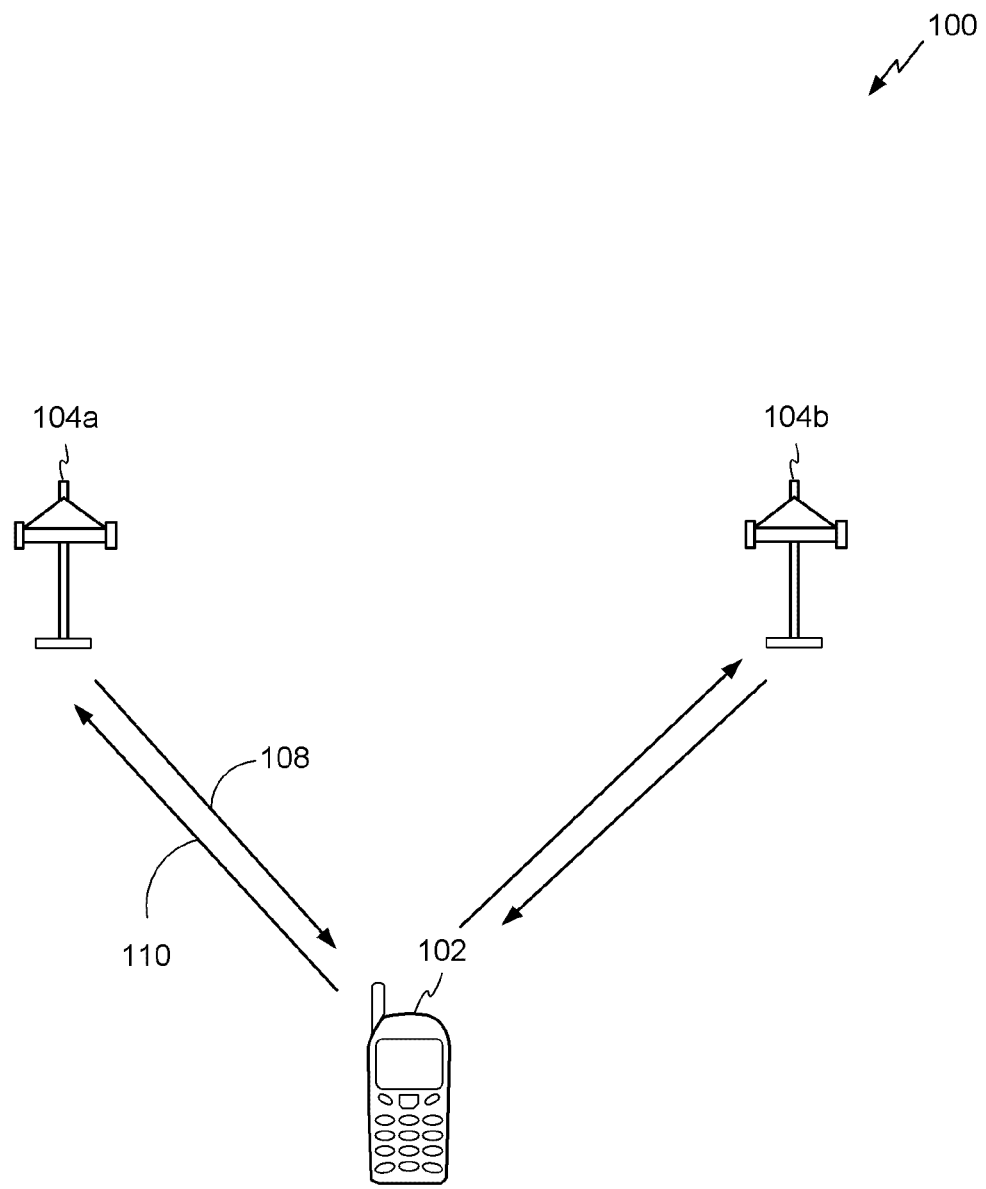
FIG. 1 illustrates an example of a wireless communication system in which aspects of the present disclosure may be employed, according to an implementation.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

In some implementations, a wireless local area network (WLAN) includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, a wearable computing device (e.g., a watch), an appliance, a sensor, a vending machine, etc. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed in accordance with an implementation. The wireless communication system 100 can include a first AP 104a and a second AP 104b. Each of the APs 104a and 104b may communicate with an STA 102, which may be a multi-SIM device, e.g., may be capable of communicating utilizing more than one radio access technology (RAT). For example, the first AP 104a may be configured as a base station associated with a first RAT while the second AP 104b may be configured as a base station associated with a second RAT. Although only two APs 104a and 104b are shown, the present application is not so limited and any number of APs serving any number of RATs may be present.

A variety of processes and methods can be used for transmissions in the wireless communication system 100 between the APs 104a and 104b and the STA 102. For example, signals can be sent and received in accordance with OFDM/OFDMA techniques. If this is the case, the wireless communication system 100 can be referred to as an OFDM/OFDMA system. Alternatively, signals can be sent and received in accordance with code division multiple access (CDMA) techniques. If this is the case, the wireless communication system 100 can be referred to as an CDMA system.

A communication link that facilitates transmission from an AP to the STA 102 can be referred to as a downlink (DL) 108, and a communication link that facilitates transmission from the STA 102 to an AP can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a respective basic service area (BSA) (not shown). An AP along with any STAs being served by the AP and/or that use the AP for communication can be referred to as a basic service set (BSS).

Figure 2:
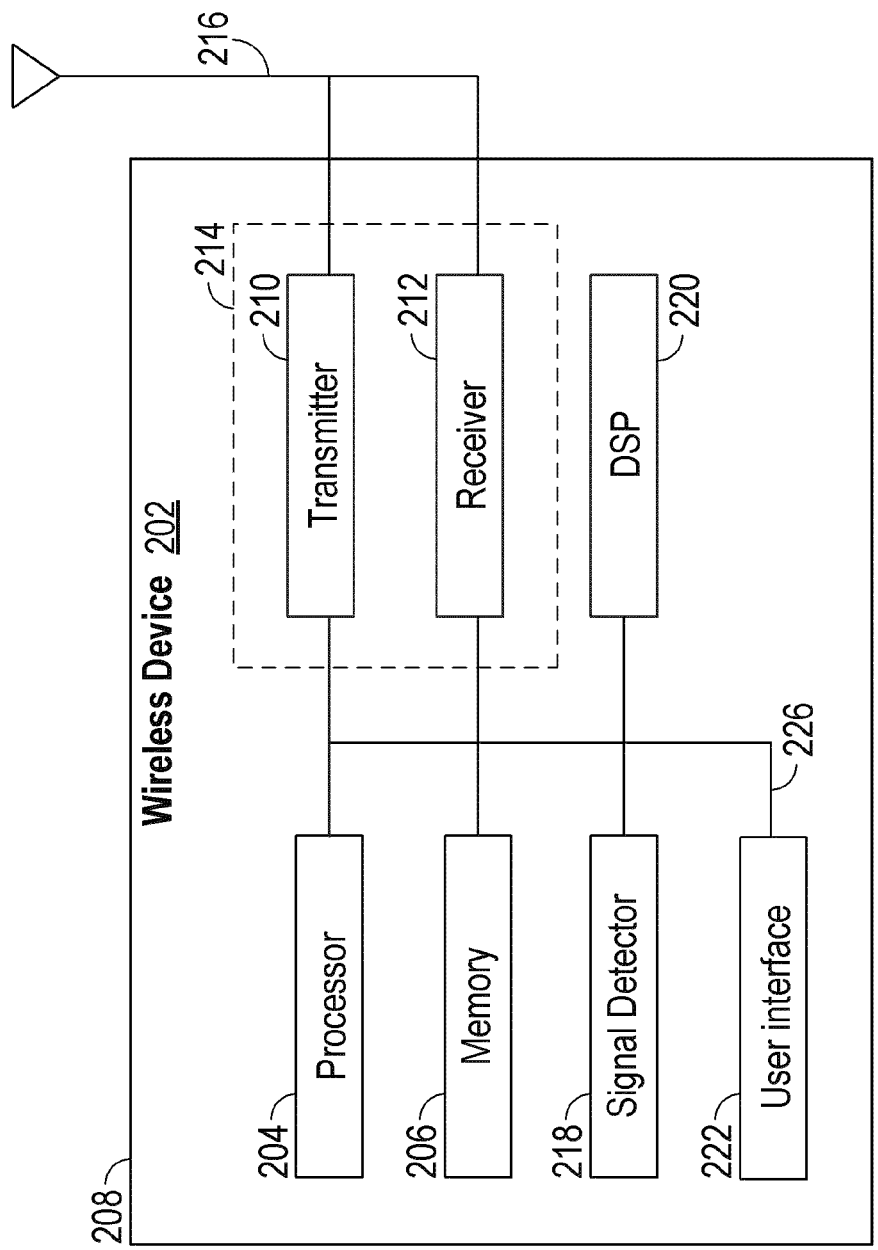
FIG. 2 illustrates various components that may be utilized in a wireless Multi-SIM device that may be employed within the wireless communication system of FIG. 1, according to an implementation.

FIG. 2 illustrates various components that can be utilized in a wireless device 202 that can be employed within the wireless communication system 100 in accordance with an implementation. The wireless device 202 is an example of a wireless device that can be configured to implement the various methods described herein. For example, the wireless device 202 can comprise one of the APs 104a and 104b or the STA 102.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 102, the processor 204 can be configured to process packets of a plurality of different packet types. For example, the processor 204 can be configured to determine the type of packet and to process the packet and/or fields of the packet accordingly.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can comprise a physical layer data unit (PPDU).

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user. The wireless device can further comprise a battery (not shown) to power the wireless device.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

In conventional multi-SIM devices, each RAT reserves resources, such as RF Chain, for a substantial duration in order to perform a desired task or activity in the near future considering marginal or worst-case channel conditions. However, in conventional operation, the RATs do not split or categorize reservations based on the type of activity to be performed. Instead, conventional operation requests a single reservation for both timing-priority (i.e., critical, time-critical, timing-priority, time-bounded or time-sensitive) tasks and timing-non-priority (i.e., noncritical, non-time-critical, timing non-priority, non-time-bounded, or time-insensitive) tasks, as will be described in more detail in connection with FIGS. 3 and 4 below.

Figure 3:
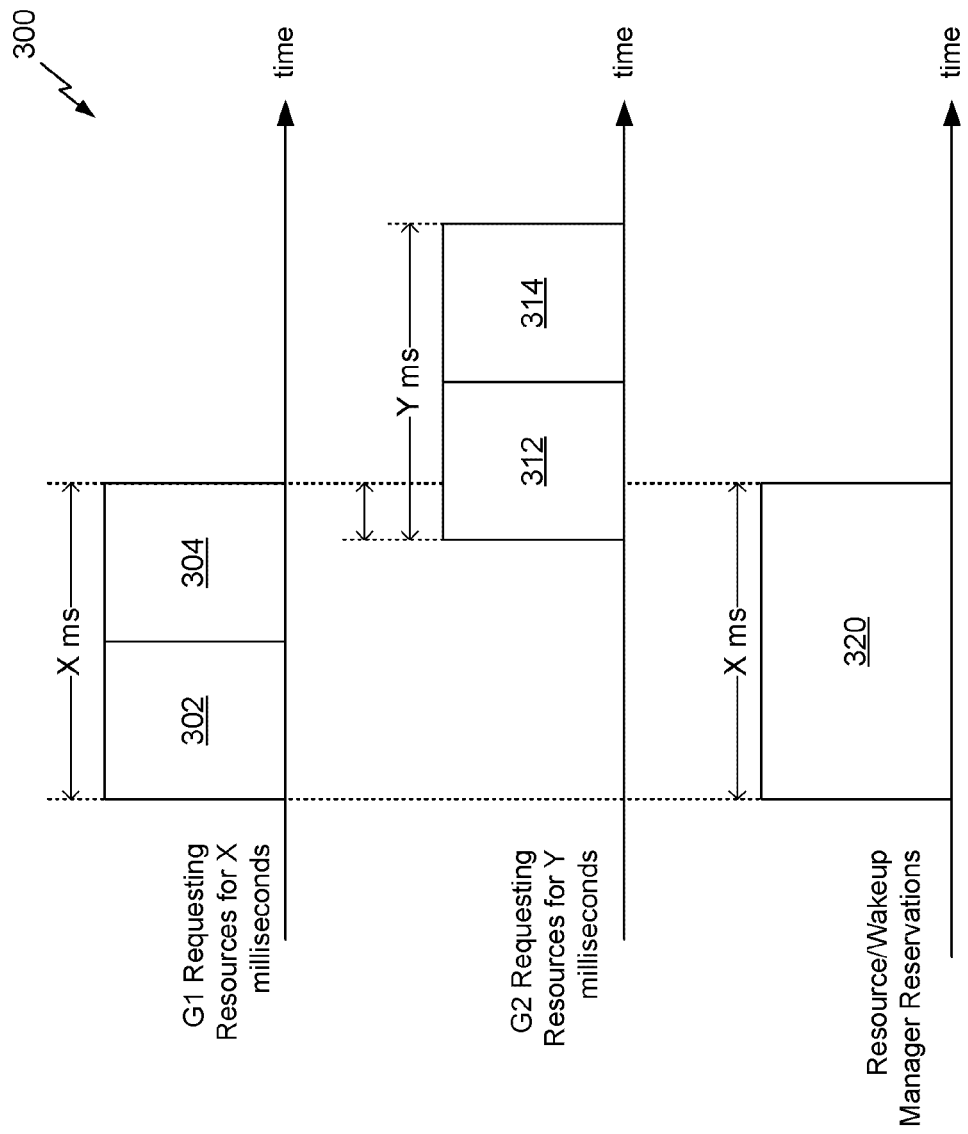
FIG. 3 is an exemplary time sequence diagram showing conventional resource requests in a multi-SIM device.

FIG. 3 is an exemplary time sequence diagram 300 showing conventional resource requests in a multi-SIM device. The diagram 300 may comprise three concurrent time sequences associated with a multi-SIM device, e.g., a dual-SIM, dual-Standby (DSDS) mobile device. A first time sequence regards reservation requests made for a first RAT (G1) in a multi-SIM device, e.g., the wireless device 202 of FIG. 2, the STA 102 of FIG. 1. A second time sequence regards reservation requests made for a second RAT (G2) in the multi-SIM device. A third time sequence regards the accepted or approved reservations made with respect to the requests for G1 and G2 in the first and second time sequences, respectively, by a resource or wakeup manager module within the multi-SIM device. In some implementations, the resource/wakeup manager may correspond to at least the processor 204 of the wireless device 202 of FIG. 2. In some implementations, the first RAT G1 may be configured to communicate via CDMA protocols, while the second RAT G2 may be configured to communicate via global system for mobile communication (GSM) protocols. However, the present application is not so limited and G1 and G2 may comprise any two disparate communication protocols used within the same multi-SIM device. The below operation description may assume the use of a single transceiver chain for transmission and reception relating to both G1 and G2.

The first RAT G1 may request a single block reservation having duration X ms. The single block reservation may encompass a duration 302 for timing-priority tasks (e.g., page demodulation) as well as a duration 304 for at least one timing-non-priority task (e.g., performing neighbor reads, etc.). Likewise, the second RAT G2 may request a single block reservation having duration Y ms. The single block reservation may encompass a duration 312 for timing-priority tasks (e.g., page demodulation) as well as a duration 314 for at least one timing-non-priority task (e.g., performing neighbor reads, etc.). It should be noted that the single block reservations do not differentiate between the timing-priority and non-time bounded tasks and thus comprise only a single requested duration, e.g., X ms and Y ms for G1 and G2, respectively. As shown, the single block reservation for G1 and the single block reservation for G2 at least partially overlap, resulting in a resource conflict. The resource/wakeup manager may confirm the entire single block reservation for G1 on a first come first served basis. However, because the single block reservation for G2 conflicts with the single block reservation for G1, the resource/wakeup manager may reject the G2 reservation in its entirety. In this conventional operation, the timing-non-priority duration 304 for G1 colliding with the timing-priority duration 312 for G2 leads to unnecessary resource denial for G2 since the conflicting durations 304 and 312 are not both for timing-priority communication activities. This results in mobile terminated performance degradation, since rejecting a resource request for G2 can result in missed page demodulations on the G2 subscription. Although FIG. 3 only illustrates two subscriptions G1 and G2, the degradation magnifies as the number of subscriptions increases per transceiver chain.

Figure 4:
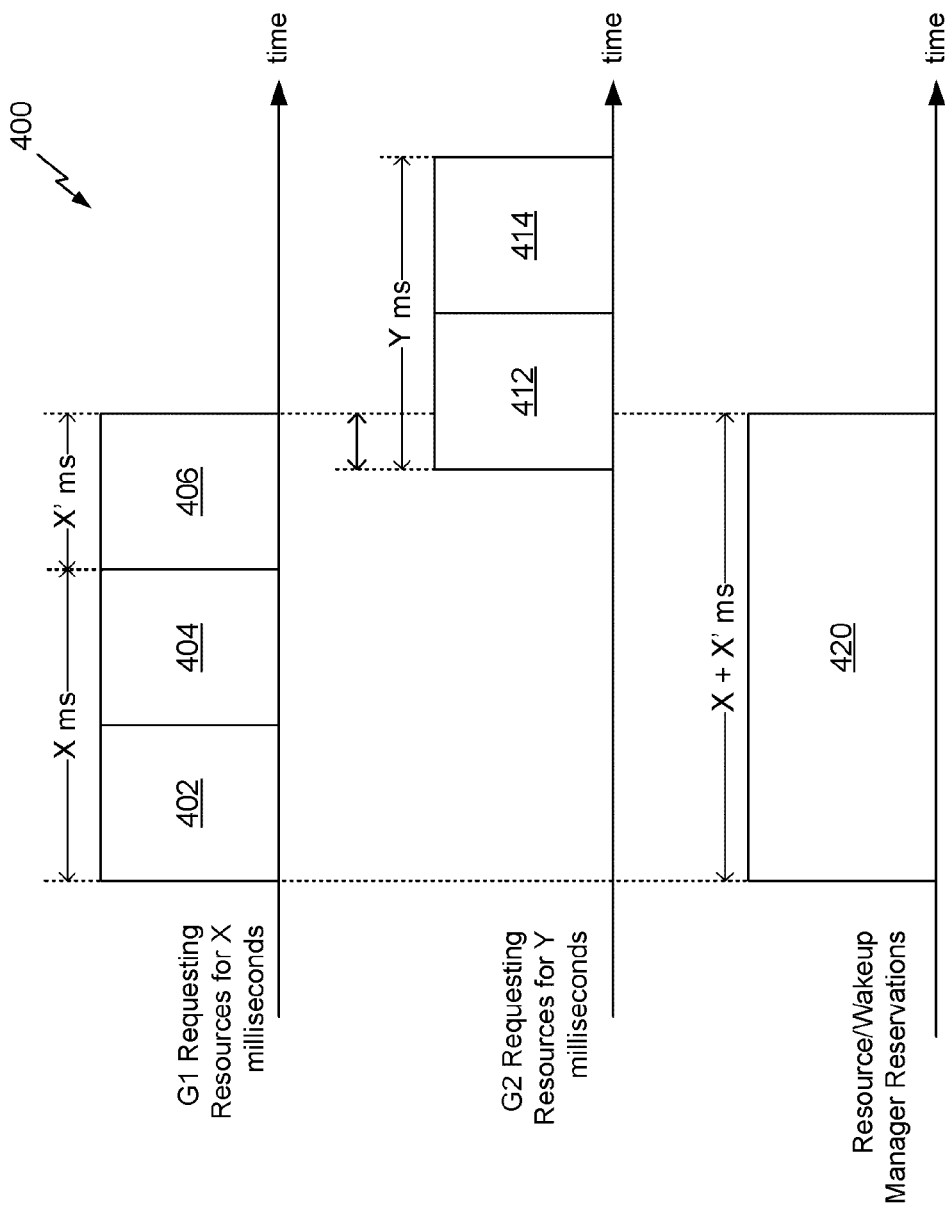
FIG. 4 is another exemplary time sequence diagram showing conventional resource requests in a multi-SIM device.

FIG. 4 is another exemplary time sequence diagram 400 showing conventional resource requests in a multi-SIM device. The diagram 400 may comprise the three concurrent time sequences as previously described in connection with FIG. 3. The first RAT G1 may request a single block reservation having duration X ms. The single block reservation may encompass a duration 402 for timing-priority tasks (e.g., page demodulation) as well as a duration 404 for at least one timing-non-priority task (e.g., performing neighbor reads, etc.). The resource/wakeup manager may approve the single block resource request for duration X ms. Once the resource/wakeup manager has approved the single block resource request from G1 for duration X ms, the first RAT G1 may request an extended reservation 406 by an additional X' ms to perform timing-non-priority (e.g., not time critical) tasks. The resource/wakeup manager may approve and extend the reservation for G1 to X+X' ms.

Once the reservation of X+X' ms has been approved, the second RAT G2 may request a single block reservation having duration Y ms. The single block reservation may encompass a duration 412 for timing-priority tasks (e.g., page demodulation) as well as a duration 414 for at least one timing-non-priority task (e.g., performing neighbor reads, etc.). Though the single block reservations encompass durations for both timing-priority and at least one timing-non-priority task, the single block reservations do not differentiate between the timing-priority and non-time bounded tasks and thus comprise only a single duration, e.g., X+X' and Y for G1 and G2, respectively. As shown, the single block reservation for G1 (encompassing the durations 402, 404 and 406) and the single block reservation for G2 at least partially overlap, resulting in a resource conflict. Because the single block reservation for G2 conflicts with the single block reservation for G1, the resource/wakeup manager may reject the G2 reservation in its entirety. The timing-non-priority duration 406 for G1 colliding with the timing-priority duration 412 for G2 leads to unnecessary resource denial to G2 since the conflicting durations 406 and 412 are not both for timing-priority communication activities. From the previously described implementations of FIGS. 3 and 4, there is a high probability that non time-critical tasks for one RAT (e.g., neighbor reads, cell reselection, out of service etc.) will collide with the critical tasks of another RAT. The present application may overcome the above-stated inefficiencies by providing alternative efficient resource management to improve overall mobile terminated call success rates in multi-SIM devices. Such implementations will be described in more detail in connection with FIGS. 5 and 6 below.

In the present application, each RAT may separately partition its activity into time critical durations and time non-critical durations and separately request reservation of resources for those durations. In such implementations, the total reservation time may be the same as previously described in connection with FIGS. 3 and 4, however, comprising separately requested durations for the time-critical and time non-critical durations. In such implementations, the resource/wakeup manager within the multi-SIM device may check for resource reservation conflicts based on the critical duration reservations of each of the RATs, and not based on total reservation time (e.g., of critical combined with non-critical durations) and grant resources accordingly. Because the duration of time critical tasks may be substantially less than the duration of time non-critical tasks, the probability of reservation request conflicts may be greatly reduced, improving mobile termination performance. Thus, in some implementations, the critical activities (e.g., access registration, reading paging channel, etc.) are timing-priority, important, and as such, may be performed at the specified times. On the other hand, the time non-critical activities (e.g., neighbor reads, out of service indications, etc.) are not timing-priority and so may be scheduled and performed later when the resources are idle. It should also be understood that the time sequence diagrams of FIGS. 3-6 show relative time periods during which resources are reserved, and not necessarily the times at which the reservation requests were transmitted or received.

Figure 5:
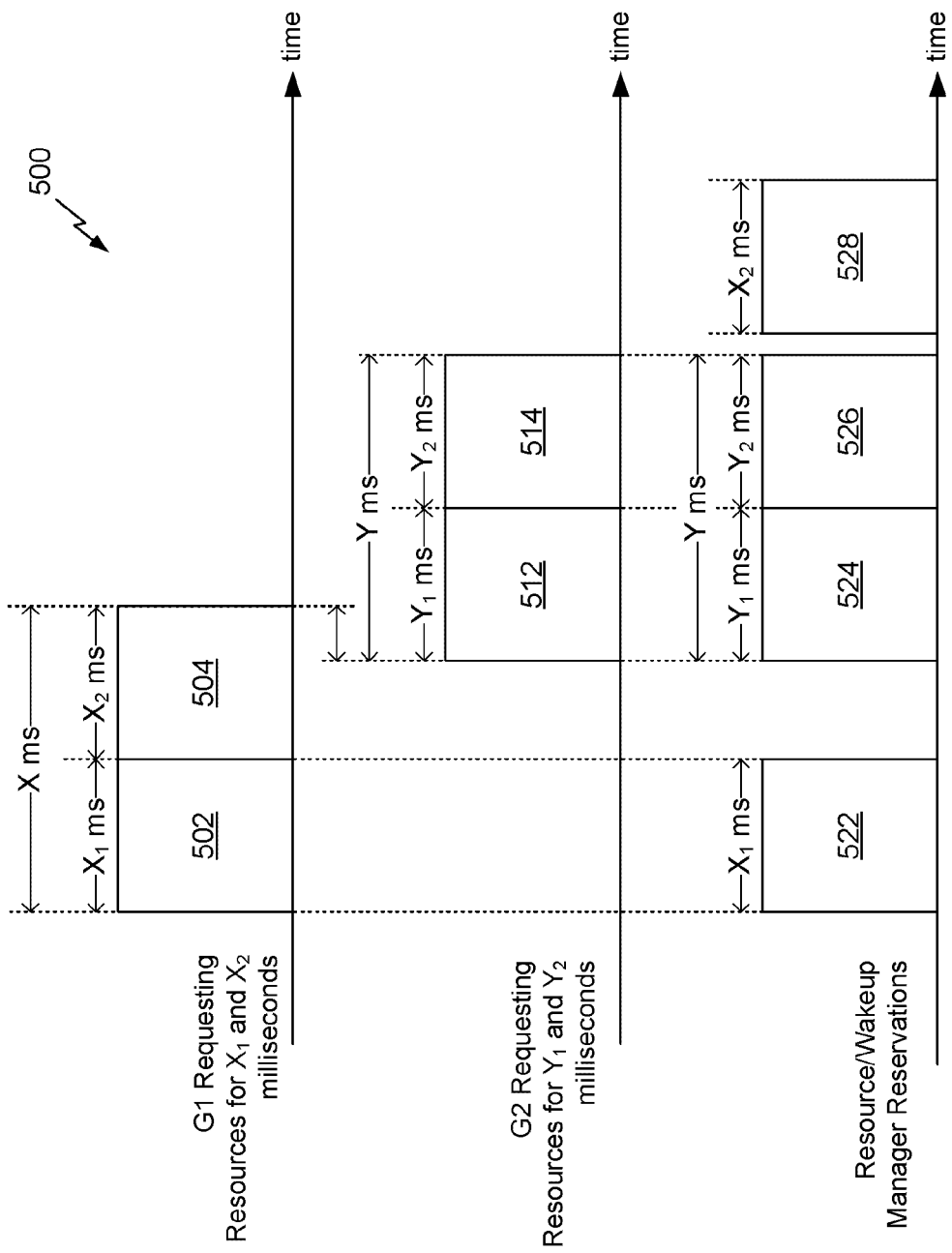
FIG. 5 is an exemplary time sequence diagram showing resource requests in a multi-SIM device that may be employed within the wireless communications system of FIG. 1, according to an implementation.

FIG. 5 is an exemplary time sequence diagram 500 showing resource requests in a multi-SIM device that may be employed within the wireless communications system of FIG. 1. The diagram 500 may comprise three concurrent time sequences associated with a dual-SIM, dual-Standby (DSDS) mobile device, for example. A first time sequence regards reservation requests made by the first RAT (G1), the second time sequence regards reservation requests made by a second RAT (G2), and the third time sequence regards the actual reservations made with respect to the requests made for G1 and G2 in the first and second time sequences, respectively, by a resource or wakeup manager module within the multi-SIM device. As with FIGS. 3 and 4, the below operation description may assume the use of a single transceiver chain for transmission and reception relating to both G1 and G2.

The first RAT G1 may request a first reservation 502 for timing-priority tasks (e.g., page demodulation) having duration $X_1$ ms. The first RAT G1 may separately request a second reservation 504 for at least one timing-non-priority task (e.g., neighbor reads) having duration $X_2$ ms. The total duration of reservations 502 and 504 (e.g., $X_1+X_2$) may be the same as the single block reservation X ms as previously described in connection with FIG. 3. Likewise, the second RAT G2 may separately request a first reservation 512 for timing-priority tasks (e.g., page demodulation) having duration $Y_1$ ms and a second reservation 514 for at least one timing-non-priority task (e.g., neighbor reads) having duration $Y_2$ ms. The total duration of reservations 512 and 514 (e.g., $Y_1+Y_2$) may be the same as the single block reservation Y ms as previously described in connection with FIG. 3. As shown, the reservation 504 for non-critical tasks for G1 and the reservation 512 for critical tasks for G2 at least partially overlap. However, because the resource/wakeup manager only rejects a reservation request based on critical task reservation overlap or conflict, the resource/wakeup manager may approve both G1's critical reservation request 502 for a duration of $X_1$ ms (e.g., at reservation 522) and G2's critical reservation request 512 for a duration of $Y_1$ ms (e.g., at reservation 524). G2's non-critical reservation request 513 is also approved at its initially requested time since no other conflicts occur at the initially requested time (e.g., at reservation 526). Since there is a time conflict between G1's non-critical reservation request 504 and G2's critical reservation request 512, the resource/wakeup manager will not reject the non-critical reservation request 504, but instead will approve it for a later time when no other conflicts exist. For example, once G2 releases the resource and when the resource then becomes idle, G1 will be allocated the resources having duration $X_2$ ms (e.g., at reservation 528) to perform the non-bounded tasks. This operation allows the multi-SIM device to be able to monitor pages on both subscriptions G1 and G2 thereby improving the mobile termination performance of the multi-SIM device. Although FIG. 5 only illustrates this issue with two subscriptions G1 and G2, this problem magnifies as the number of subscriptions increases per transceiver chain. In addition, in some implementations, the corresponding RATs may adjust, update or change the durations of the time-critical and non time-critical reservation durations in real time based on channel conditions. The resource/wakeup manager may then update the approved reservations after adjustment, update, or change.

Figure 6:
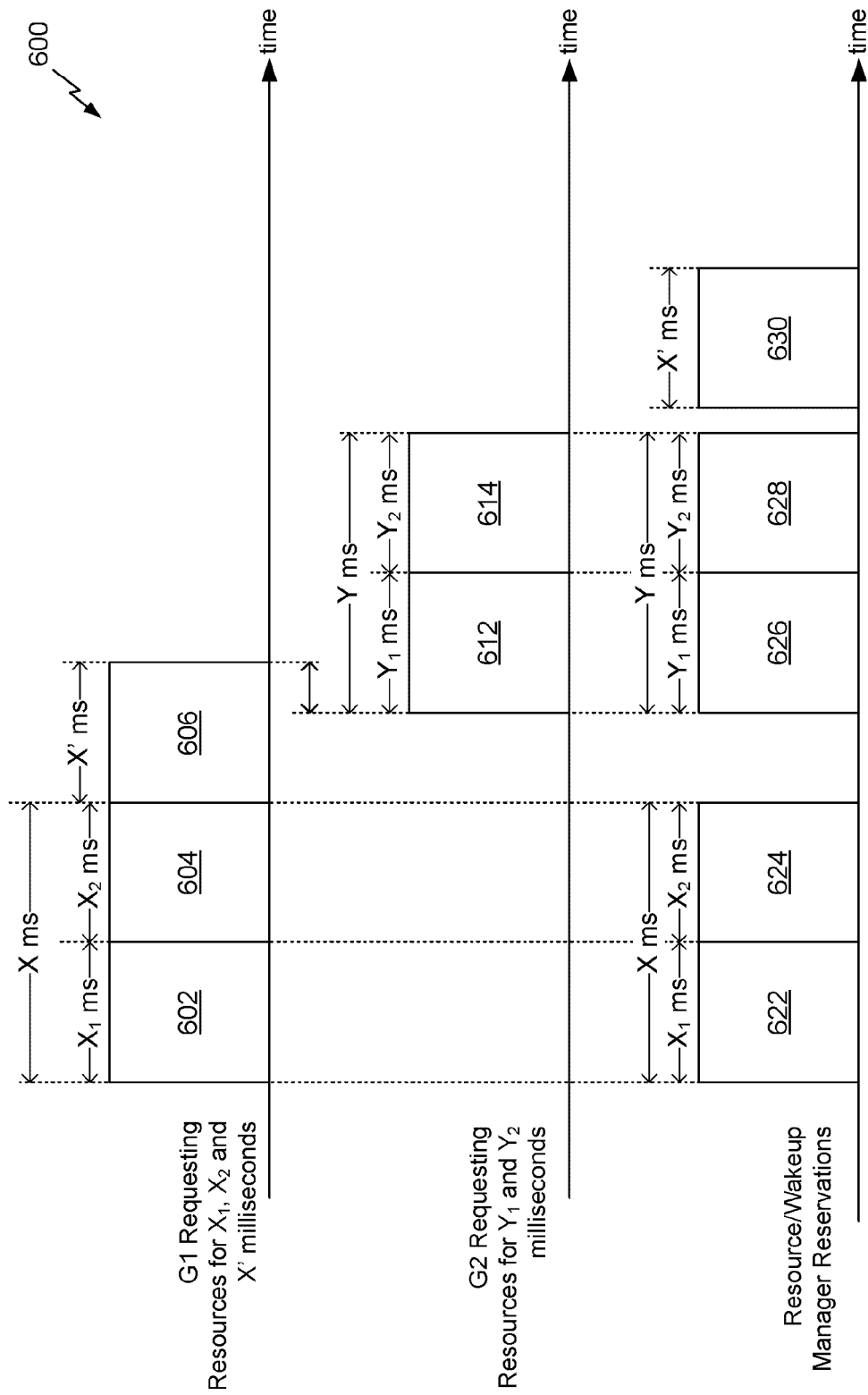
FIG. 6 is another exemplary time sequence diagram showing resource requests in a multi-SIM device that may be employed within the wireless communications system of FIG. 1, according to an implementation.

FIG. 6 is another exemplary time sequence diagram 600 showing resource requests in a multi-SIM device that may be employed within the wireless communications system of FIG. 1. The diagram 600 may comprise the three concurrent time sequences as previously described in connection with FIG. 5. As with FIGS. 3-5, the below operation description may assume the use of a single transceiver chain for transmission and reception relating to both G1 and G2.

The first RAT G1 may request a first reservation 602 for timing-priority tasks (e.g., page demodulation) having duration $X_1$ ms. The first RAT G1 may separately request a second reservation 604 for at least one timing-non-priority task (e.g., neighbor reads) having duration $X_2$ ms. The total duration of reservations 602 and 604 (e.g., $X_1+X_2$) may be the same as the single block reservation X ms as previously described in connection with FIG. 3. At a later time, the first RAT G1 may separately extend the reserved duration for an additional duration X' ms with a third reservation 606 for at least one timing-non-priority task (e.g., for cell reselection and out of service operations). Likewise, the second RAT G2 may separately request a first reservation 612 for timing-priority tasks (e.g., page demodulation) having duration $Y_1$ ms and a second reservation 614 for at least one timing-non-priority task (e.g., neighbor reads) having duration $Y_2$ ms. The total duration of reservations 612 and 614 (e.g., $Y_1+Y_2$) are the same as the single block reservation Y ms as previously described in connection with FIG. 3. As shown, the reservation 606 for non-critical tasks for G1 and the reservation 612 for critical tasks for G2 at least partially overlap. However, because the resource/wakeup manager only rejects a reservation request based on critical task reservation overlap, the resource/wakeup manager may approve G1's critical reservation request 602 for a duration of $X_1$ ms (e.g., at reservation 622), G1's non-critical reservation request 604 for a duration of $X_2$ (e.g., at reservation 624), and G2's critical reservation request 612 for a duration of $Y_1$ ms (e.g., at reservation 626). G2's non-critical reservation request 613 is also approved at its initially requested time since no other conflicts occur at the initially requested time (e.g., at reservation 628). Since there is a time conflict between G1's non-critical reservation request 606 and G2's critical reservation request 612, the resource/wakeup manager will not reject the non-critical reservation request 606, but instead will approve it for a later time when no other conflicts exist. For example, once G2 releases the resource and when the resource then becomes idle, G1 will be allocated the resources having duration X' ms to perform the non-bounded tasks (e.g., at reservation 630). This operation allows the multi-SIM device to be able to monitor pages on both subscriptions G1 and G2 thereby improving the mobile termination performance of the multi-SIM device. Although FIG. 6 only illustrates this issue with two subscriptions G1 and G2, this problem magnifies as the number of subscriptions increases per transceiver chain.

Figure 7:
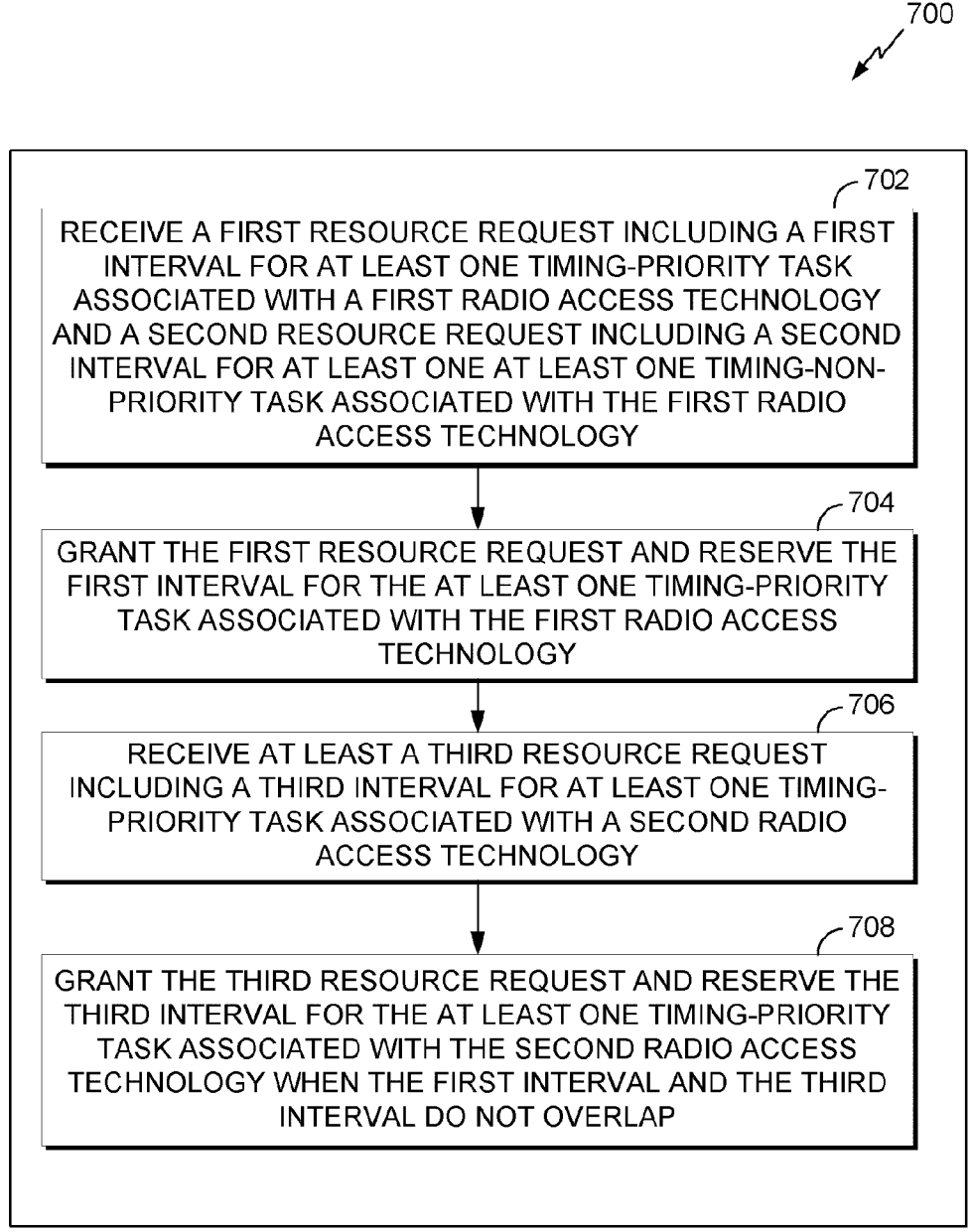
FIG. 7 is a flow chart of an exemplary method for efficient resource management in a Multi-SIM device that may be employed within the wireless communications system of FIG. 1, according to an implementation.

FIG. 7 is a flow chart of an exemplary method 700 for wireless communication. In some implementations, the method 700 can be performed by a wireless device, such as the wireless device 202 of FIG. 2. Although the method 700 in FIG. 7 is illustrated in a particular order, in some implementations the blocks herein may be performed in a different order, or omitted, and additional blocks can be added. A person of ordinary skill in the art will appreciate that the process of the illustrated implementation may be implemented in any wireless device that can be configured to process and transmit a generated message.

Operation block 702 includes receiving a first resource request including a first interval for at least one timing-priority task associated with a first radio access technology and a second resource request including a second interval for at least one timing-non-priority task associated with the first radio access technology. For example, as previously described in connection with FIG. 5, the processor 204 of the wireless device 202 of FIG. 2 may receive, from G1, the first reservation 502 for at least one timing-priority task having duration $X_1$ ms, and the second reservation 504 for at least one timing-non-priority task having duration $X_2$ ms. Likewise, in FIG. 6, the processor 204 of FIG. 2 may receive, from G1, the first reservation 602 and the second reservation 604.

Operation block 704 includes granting the first resource request and reserving the first interval for the at least one timing-priority task associated with the first radio access technology. For example, as previously described in connection with FIG. 5, the processor 204 of the wireless device 202 of FIG. 2 may grant the first reservation 502 as reservation 522 having duration $X_1$ ms. Likewise, in FIG. 6, the processor 204 of FIG. 2 may grant the first reservation 602 as reservation 622 having duration $X_1$ ms.

Operation block 706 includes receiving at least a third resource request including a third interval for at least one timing-priority task associated with a second radio access technology. For example, as previously described in connection with FIG. 5, the processor 204 of the wireless device 202 of FIG. 2 may receive, from G2, the first reservation 512 for at least one timing-priority task having the duration $Y_1$ ms. Likewise, in FIG. 6, the processor 204 of the wireless device 202 of FIG. 2 may receive, from G2, the first reservation 612 for at least one timing-priority task having the duration $Y_1$ ms.

Operation block 708 includes granting the third resource request and reserving the third interval for the at least one timing-priority task associated with the second radio access technology when the first interval and the third interval do not overlap. For example, as previously described in connection with FIG. 6, the processor 204 of the wireless device 202 of FIG. 2 may grant the first reservation 612 as reservation 626 since the reservation would not conflict with another existing reservation.

Figure 8:
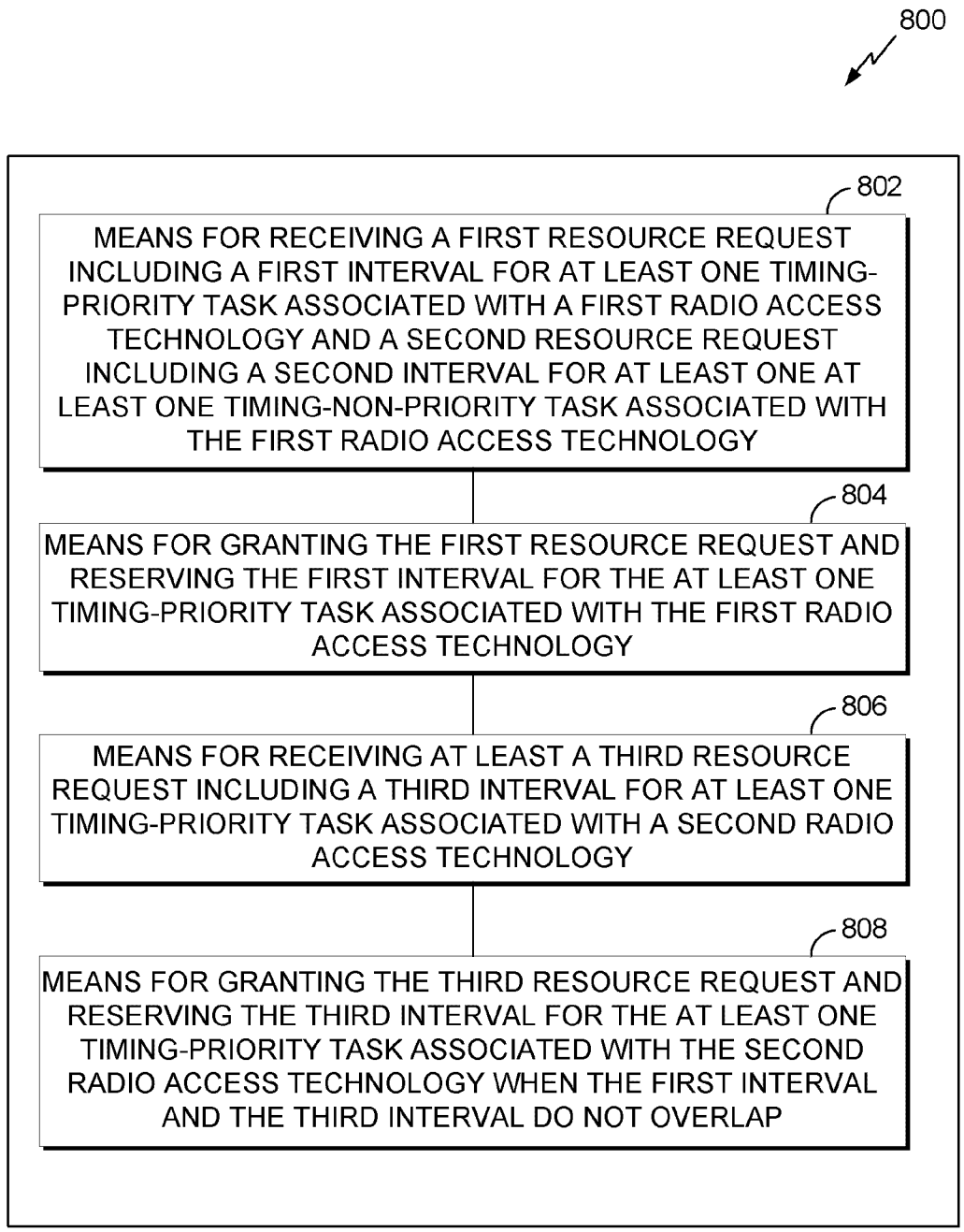
FIG. 8 is a functional block diagram of a wireless device that can be employed to perform the method of FIG. 7 in the wireless communication system of FIG. 1, according to an implementation.

FIG. 8 is a functional block diagram of an apparatus 800 that can be employed to perform a method 700 of FIG. 7 in the wireless communication system of FIG. 1. Those skilled in the art will appreciate that the apparatus 800 may have more components than the simplified block diagrams shown in FIG. 8. FIG. 8 includes only those components useful for describing some prominent features of implementations within the scope of the claims.

The wireless device 800 includes means 802 for receiving a first resource request including a first interval for at least one timing-priority task associated with a first radio access technology and a second resource request including a second interval for at least one timing-non-priority task associated with the first radio access technology. In some implementations, means 802 may be configured to perform one or more of the functions with respect to operation block 702 of FIG. 7. In various implementations, means 702 may be implemented by the processor 204 or DSP 220 of the wireless device 202 of FIG. 2.

The wireless device 800 further includes means 804 for granting the first resource request and reserving the first interval for the at least one timing-priority task associated with the first radio access technology. In some implementations, means 804 may be configured to perform one or more of the functions described above with respect to operation block 704 of FIG. 7. In various implementations, means 804 for performing may be implemented by the processor 204 or DSP 220 of the wireless device 202 of FIG. 2.

The wireless device 800 further includes means 806 for receiving at least a third resource request including a third interval for at least one timing-priority task associated with a second radio access technology. In some implementations, means 806 may be configured to perform one or more of the functions described above with respect to operation block 706 of FIG. 7. In various implementations, means 806 may be implemented by the processor 204 or DSP 220 of the wireless device 202 of FIG. 2.

The wireless device 800 further includes means 808 for granting the third resource request and reserving the third interval for the at least one timing-priority task associated with the second radio access technology when the first interval and the third interval do not overlap. In some implementations, means 808 may be configured to perform one or more of the functions described above with respect to operation block 708 of FIG. 7. In various implementations, means 808 may be implemented by the processor 204 or DSP 220 of the wireless device 202 of FIG. 2.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof In some aspects, wireless signals may be transmitted utilizing various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
receiving a first resource request including a first interval for at least one timing-priority task associated with a first radio access technology and a second resource request including a second interval for at least one timing-non-priority task associated with the first radio access technology;
granting the first resource request and reserving the first interval for the at least one timing-priority task associated with the first radio access technology;
receiving at least a third resource request including a third interval for at least one timing-priority task associated with a second radio access technology; and
granting the third resource request and reserving the third interval for the at least one timing-priority task associated with the second radio access technology when the first interval and the third interval do not overlap.

2. The method of claim 1, comprising granting the second resource request and reserving the second interval for the at least one timing-non-priority task associated with the first radio access technology when the second interval and the third interval do not overlap.

3. The method of claim 1, comprising denying the third resource request when the first interval and the third interval overlap.

4. The method of claim 1, comprising:
denying the second resource request at the second interval when the second interval and the third interval overlap; and
reserving a fourth interval, after the third interval, for the at least one timing-non-priority task associated with the first radio access technology when the second interval and the third interval overlap.

5. The method of claim 2, comprising:
receiving a request to extend the duration of the second interval corresponding to the second resource request for the at least one timing-non-priority task associated with the first radio access technology;
granting the request to extend the duration of the second interval when the extended duration second interval would not overlap with an existing reservation.

6. The method of claim 5, comprising:
denying the request to extend the duration of the second interval when the extended duration second interval would overlap with an existing reservation; and
reserving an extension interval for the at least one timing-non-priority task associated with the first radio access technology at a later time that does not overlap with an existing reservation.

7. The method of claim 1, wherein the first radio access technology is configured to communicate utilizing a different communication protocol than the second radio access technology.

8. The method of claim 1, wherein the first radio access technology and the second radio access technology communicate utilizing the same transceiver.

9. An apparatus for wireless communication, comprising:
a processor configured to:
receive a first resource request including a first interval for at least one timing-priority task associated with a first radio access technology and a second resource request including a second interval for at least one timing-non-priority task associated with the first radio access technology;
grant the first resource request and reserve the first interval for the at least one timing-priority tasks associated with the first radio access technology;
receive at least a third resource request including a third interval for at least one timing-priority task associated with a second radio access technology; and
grant the third resource request and reserve the third interval for the at least one timing-priority task associated with the second radio access technology when the first interval and the third interval do not overlap.

10. The apparatus of claim 9, wherein the processor is configured to grant the second resource request and reserve the second interval for at least one timing-non-priority task associated with the first radio access technology when the second interval and the third interval do not overlap.

11. The apparatus of claim 9, wherein the processor is configured to deny the third resource request when the first interval and the third interval overlap.

12. The apparatus of claim 9, wherein the processor is further configured to:
deny the second resource request at the second interval when the second interval and the third interval overlap; and
reserve a fourth interval, after the third interval, for the at least one timing-non-priority task associated with the first radio access technology when the second interval and the third interval overlap.

13. The apparatus of claim 10, wherein the processor is further configured to:
receive a request to extend the duration of the second interval corresponding to the second resource request for at least one timing-non-priority task associated with the first radio access technology;
grant the request to extend the duration of the second interval when the extended duration second interval would not overlap with an existing reservation.

14. The apparatus of claim 13, wherein the, processor is further configured to:
deny the request to extend the duration of the second interval when the extended duration second interval would overlap with an existing reservation; and
reserve an extension interval for at least one timing-non-priority task associated with the first radio access technology at a later time that does not overlap with an existing reservation.

15. The apparatus of claim 9, wherein the first radio access technology is configured to communicate utilizing a different communication protocol than the second radio access technology.

16. The apparatus of claim 9, comprising a transceiver, wherein the first radio access technology and the second radio access technology both communicate utilizing the transceiver.

17. A non-transitory computer-readable medium, comprising code that, when executed, causes a processor to:
receive a first resource request including a first interval for at least one timing-priority task associated with a first radio access technology and a second resource request including a second interval for at least one timing-non-priority task associated with the first radio access technology;
grant the first resource request and reserve the first interval for the at least one timing-priority task associated with the first radio access technology;
receive at least a third resource request including a third interval for at least one timing-priority task associated with a second radio access technology; and
grant the third resource request and reserve the third interval for the at least one timing-priority task associated with the second radio access technology when the first interval and the third interval do not overlap.

18. The non-transitory computer-readable medium of claim 17, wherein the code, when executed, causes the processor to grant the second resource request and reserving the second interval for at least one timing-non-priority task associated with the first radio access technology when the second interval and the third interval do not overlap.

19. The non-transitory computer-readable medium of claim 17, wherein the code, when executed, causes the processor to deny the third resource request when the first interval and the third interval overlap.

20. The non-transitory computer-readable medium of claim 17, wherein the code, when executed, causes the processor to:
deny the second resource request at the second interval when the second interval and the third interval overlap; and
reserve a fourth interval, after the third interval, for the at least one timing-non-priority task associated with the first radio access technology when the second interval and the third interval overlap.

21. The non-transitory computer-readable medium of claim 18, wherein the code, when executed, causes the processor to:
receive a request to extend the duration of the second interval corresponding to the second resource request for at least one timing-non-priority task associated with the first radio access technology;
grant the request to extend the duration of the second interval when the extended duration second interval would not overlap with an existing reservation.

22. The non-transitory computer-readable medium of claim 21, wherein the code, when executed, causes the processor to:
deny the request to extend the duration of the second interval when the extended duration second interval would overlap with an existing reservation; and
reserve an extension interval for at least one timing-non-priority task associated with the first radio access technology at a later time that does not overlap with an existing reservation.

23. The non-transitory computer-readable medium of claim 17, wherein the first radio access technology and the second radio access technology communicate utilizing the same transceiver.

24. An apparatus for wireless communication, comprising:
means for receiving a first resource request including a first interval for at least one timing-priority task associated with a first radio access technology and a second resource request including a second interval for at least one timing-non-priority task associated with the first radio access technology;
means for granting the first resource request and reserving the first interval for the at least one timing-priority task associated with the first radio access technology;
means for receiving at least a third resource request including a third interval for at least one timing-priority task associated with a second radio access technology; and
means for granting the third resource request and reserving the third interval for the at least one timing-priority task associated with the second radio access technology when the first interval and the third interval do not overlap.

25. The apparatus of claim 9, comprising means for granting the second resource request and reserve the second interval for at least one timing-non-priority task associated with the first radio access technology when the second interval and the third interval do not overlap.

26. The apparatus of claim 9, comprising means for denying the third resource request when the first interval and the third interval overlap.

27. The apparatus of claim 9, comprising:
means for denying the second resource request at the second interval when the second interval and the third interval overlap; and
means for reserving a fourth interval, after the third interval, for the at least one timing-non-priority task associated with the first radio access technology when the second interval and the third interval overlap.

28. The apparatus of claim 10, comprising:
means for receiving a request to extend the duration of the second interval corresponding to the second resource request for at least one timing-non-priority task associated with the first radio access technology;
means for granting the request to extend the duration of the second interval when the extended duration second interval would not overlap with an existing reservation.

29. The apparatus of claim 13, comprising:
means for denying the request to extend the duration of the second interval when the extended duration second interval would overlap with an existing reservation; and
means for reserving an extension interval for at least one timing-non-priority task associated with the first radio access technology at a later time that does not overlap with an existing reservation.

30. The apparatus of claim 9, comprising means for transmitting and receiving wireless communications, wherein the first radio access technology and the second radio access technology both communicate utilizing the same means for transmitting and receiving wireless communications.

* * * * *